A. ATKINSON.
STIRRUP FOR REINFORCED CONCRETE.
APPLICATION FILED DEC. 24, 1910.

1,110,416.

Patented Sept. 15, 1914.

Witnesses:
Raphaël Letter
Wm Bohleber

Asher Atkinson Inventor
By his Attorneys
Kerr Page Cooper & Hayward

UNITED STATES PATENT OFFICE.

ASHER ATKINSON, OF NEW BRUNSWICK, NEW JERSEY, ASSIGNOR, BY MESNE ASSIGNMENTS, TO HENRY B. NEWHALL, OF LITTLETON, NEW HAMPSHIRE.

STIRRUP FOR REINFORCED CONCRETE.

1,110,416.  Specification of Letters Patent.  Patented Sept. 15, 1914.

Application filed December 24, 1910. Serial No. 599,118.

*To all whom it may concern:*

Be it known that I, ASHER ATKINSON, a citizen of the United States, residing at New Brunswick, in the county of Middlesex and State of New Jersey, have invented certain new and useful Improvements in Stirrups for Reinforced Concrete, of which the following is a full, clear, and exact description.

This invention relates to a stirrup for reinforced concrete construction and especially adapted to be used in connection with beams although it is capable of more or less general application.

Figure 1:
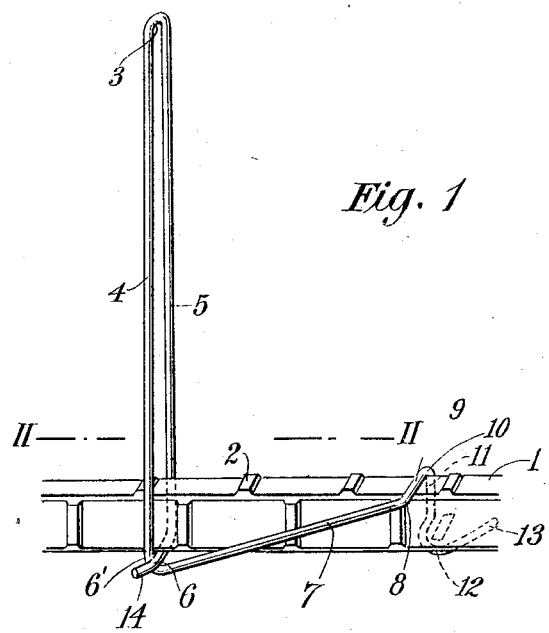
Figure 2:
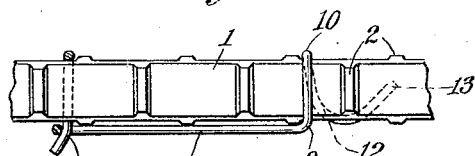
Figure 3:
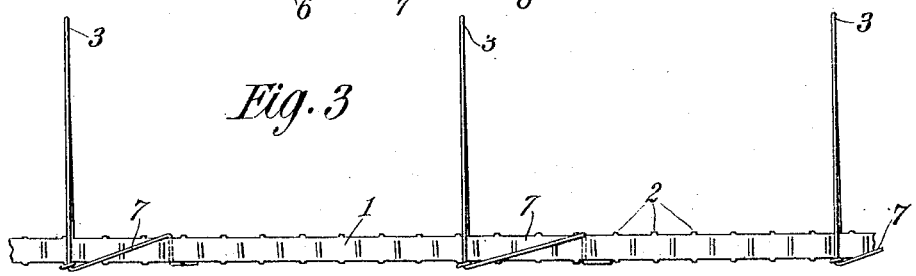
Figure 4:
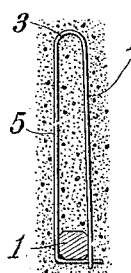

To these ends the invention consists in certain novel and peculiar features of construction of parts, as hereinafter described and claimed, and in order that it may be fully understood reference is to be had to the accompanying drawing in which:

Figure 1 is a side view of my novel stirrup and the preferred form of bar to which it is to be connected; Fig. 2 is a plan view taken on the line II—II of Fig. 1; Fig. 3 is a view in side elevation, on a reduced scale, showing several stirrups connected to a bar, and Fig. 4 is a cross section of the bar just in front of the stirrup, showing the same embedded in the concrete.

Referring to the drawings in detail, 1 indicates a reinforcing bar of any suitable contour. This bar is preferably of rectangular form and upon the sides thereof are elongated lugs 2 extending transversely thereof, alternating with each other on the different sides. To the bar is attached my novel stirrup. The same comprises the upright portion or loop 3 which is embedded in the concrete. The arm 4 of the loop extends downwardly to the lower side of the bar and engages with the arm 5 at the point 6, the arm 5 being bent half way around the bar as shown. The arm 4 is bent at 6' and extends upwardly and forwardly, this upwardly and forwardly extending portion being designated 7. The portion 7 is bent substantially at right angles at 8 and extends across the top and constitutes the portion 9. This portion 9 is in turn bent at right angles at 10 and constitutes the portion 11 and the latter is bent to form the loop 12 the projecting portion thereof being designated by 13, the latter being located approximately midway between the lower corners of the bar as shown. It will be noted that the stirrup formed in this peculiar way has a side opening between the portions 9 and 12 equal to the thickness of the bar to be used and allows the bar to be inserted into the loop formed by the portions 9, 11 and 12. The projecting portion 13 is so formed as to contact with the lower surface of the bar and holds the same in the position shown. As before stated the arm 5 is bent at 6. This bend is so made that when the bend 6' of the arm 4 is placed over the portion 14 the former will ride down the latter, owing to the resiliency of the loop 3 and cause the said arms 4 and 5 to hug the bar 1.

In assembling the loop constituted by the parts 9, 11 and 12 is placed upon the bar at the desired place. The arms 4 and 5 of the loop 3 are spread apart and the bar inserted therebetween. The part 14 is then forced over the bend 6'. The transverse projections 2 engage with the stirrup which prevents the latter from sliding longitudinally of the bar.

If for any reason the loop 3 does not hug the bar 1 the stirrup will, nevertheless, be held in proper position by means of the projecting end 13 pressing on the undersurface of the bar 1 which will tend to rock the entire stirrup upon the portion 9 and thereby cause the arms 4 and 5 of the loop to move vertically and the portion 6 be brought into contact with the lower portion of the bar 1, Figs. 1 and 3. The resiliency of the members 7, 9, 11, 12 and 13 will insure that the stirrup will remain in the position in which it is placed on the bar 1.

What I claim is:

1. In a stirrup for concrete construction, a bar, a resilient loop projecting upwardly from the bar, one arm of said loop bent substantially half around said bar and then rearwardly, the other arm of said loop bent to an acute angle, the rearwardly projecting portion of the first named arm adapted to engage the acute angle of the second named arm.

2. In a device of the class described comprising in combination, a bar, a stirrup comprising a loop extending upwardly from a point below said bar and having two arms, one of said arms provided with means thereon for effecting a camming engagement with the other below said bar whereby the said arms are caused to engage with the sides of said bar, an extension on one of said arms along one side of the bar, a loop on said extension at a distance from the first mentioned loop adapted to engage a projection on said bar to prevent the same from slipping lengthwise thereof, and means on said second mentioned loop to aid in maintaining the first mentioned loop snug against the under side of said bar.

3. In a stirrup for reinforcing concrete, comprising an upwardly extending resilient loop adapted to engage a bar, one of the arms of said loop bent at an angle and extending forwardly and having means thereon to engage the bar, the other of said arms bent at an angle and adapted to engage the first mentioned arm at the angle thereof.

4. A stirrup comprising a loop mounted upon and projecting upwardly from a bar, said loop formed by a plurality of resilient arms, an extension on one of said arms and a second loop substantially of U-shaped formation on said extension adapted to engage said bar, said arms adapted to be separated in placing said loop over said bar and one of said arms having means thereon for effecting a camming engagement with the other after being placed thereon to support the loop.

5. In a stirrup for reinforcing concrete, comprising an upwardly extending resilient loop adapted to engage a bar, one of the arms of said loop bent at an angle and extending forwardly and having means thereon to engage the bar, the other of said arms bent at an angle and adapted to engage the first mentioned arm.

6. A stirrup for reinforced construction, comprising an upwardly extending resilient loop formed by two arms adapted to cross each other and form a lock beneath a reinforcing bar, one of the arms of the loop being extended and provided with a gripping member to coöperate with a reinforcing bar to firmly hold the closed end of the stirrup in contact with the underside of the reinforcing bar and the entire stirrup in its proper longitudinal position on said bar.

In testimony whereof I affix my signature in the presence of two subscribing witnesses.

ASHER ATKINSON.

Witnesses:
 M. LAWSON DYER,
 WM. BOHLEBER.

---

Copies of this patent may be obtained for five cents each, by addressing the "Commissioner of Patents, Washington, D. C."